Jan. 19, 1954   W. JAGGI   2,666,509
ELECTRIC MOTOR WITH BUILT-IN FLYWHEEL AND CLUTCH
Filed Jan. 7, 1952
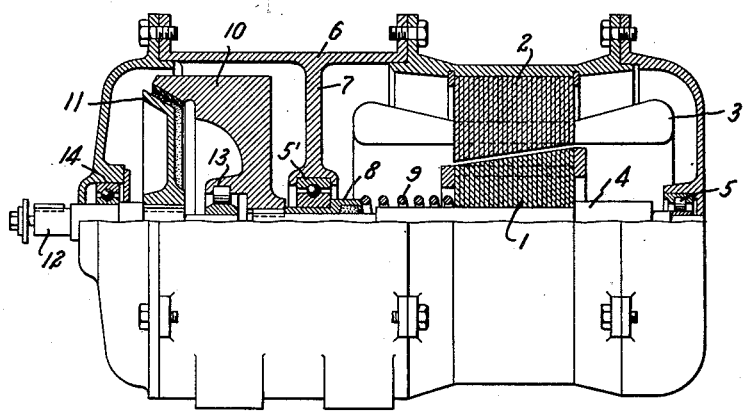
Fig. 1.
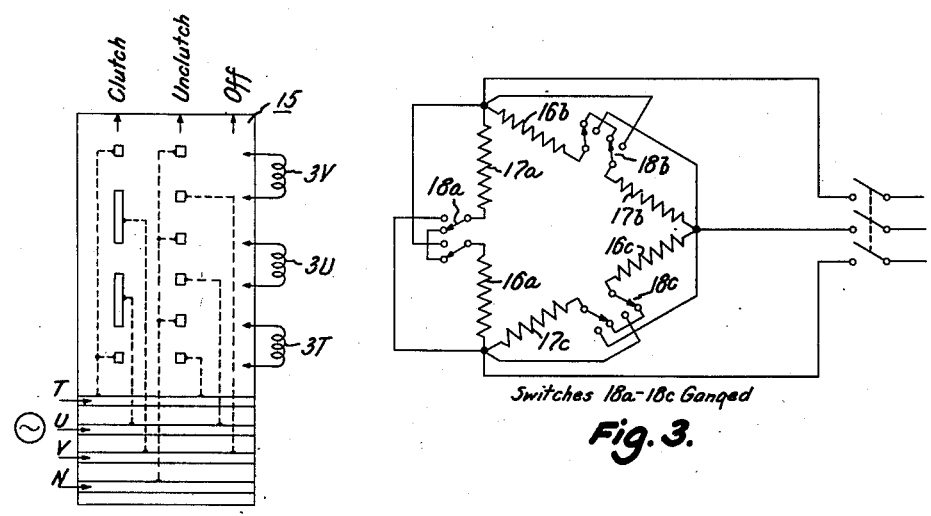
Fig. 2.
Fig. 3.
INVENTOR:
Walter Jaggi,
BY Pierce, Scheffler + Parker,
ATTORNEYS.

Patented Jan. 19, 1954

2,666,509

UNITED STATES PATENT OFFICE 2,666,509

ELECTRIC MOTOR WITH BUILT-IN FLYWHEEL AND CLUTCH

Walter Jaggi, Baden, Switzerland, assignor to Aktiengesellschaft Brown, Boveri & Cie, Baden, Switzerland, a joint stock company Application January 7, 1952, Serial No. 265,269

Claims priority, application Switzerland January 11, 1951

3 Claims. (Cl. 192—.02)

This invention relates to electric motors with built-in flywheels and clutches and more particularly to energizing systems for such assemblies which provide a purely electric control of the clutch.

In the drive of certain machines, for example in the textile industry and also in machine tools, it is necessary to provide a flywheel mass on the drive shaft of the machine to damp out the effects of sudden changes in the load. In the case of machine disturbance or plant-caused stoppages, it is very important, however, that the driven machine be stopped as quickly as possible, for which purpose it is necessary to disengage the driving motor and the flywheel mass from the machine.

Objects of the invention are to provide electric motors having built-in flywheels and clutches, and in which the motor armature is axially displaceable in response to the magnetic field strength to control the clutch. An object is to provide a motor of the type stated in which the flywheel is mounted on the armature shaft and forms one element of the clutch, the flywheel and clutch being housed in the motor casing. Objects are to provide motors of the type stated in which a two-position switch controls the motor field strength and thereby the clutch condition, the arrangements being such that the motor continues in operation upon the disengagement of the clutch and provides a rapid restarting of the driven machine when it is to be placed in operation again.

These and other objects and the advantages of the invention will be apparent from the following specification when taken with the accompanying drawings in which:

Fig. 1 is a side elevation, with parts in central longitudinal section, of a motor embodying the invention; and Figs. 2 and 3 are schematic circuit diagrams of different switch and motor field windings according to the invention.

In Fig. 1, the reference numeral 1 identifies a conical armature of a multiphase alternating current motor having a complementary conically shaped stator 2. In such a motor, for example as described in Swiss Patent No. 244,438, the magnetic field established by the stator windings 3 develops a torque which sets the armature into rotation and which also imposes an axial magnetic pull tending to shift the armature to the left as seen in Fig. 1. The armature shaft 4 is rotatably and slidably supported by roller bearings 5, 5' mounted in the motor housing 6 and a transverse web 7 thereof, respectively. Preferably, although not necessarily, an elongated cylindrical bearing 8 for the shaft is carried by the inner race of the ball bearing 5'. A coiled compression spring 9 surrounds the motor shaft 4 and is seated between the rotor 1 and the bearing 4 to urge the rotor 1 towards the right as seen in Fig. 1, the axial thrust being taken up by the bearing 5' and the web 7.

A flywheel 10 is secured to the left end of the shaft 4 and constitutes a part of a clutch, the cooperating clutch part 11 being fixed to the stub shaft 12 which is supported in bearings 13, 14 and has means at its outer end for connection to the drive shaft of a loom or other machine.

The field windings are so sectionalized and connected to a three-phase alternating current source that either a relatively weak or a relatively strong motor field may be produced to set the armature 1 into rotation, and the spring 9 is of such strength as to prevent an axial displacement of the armature by the weaker field. The motor is started by adjusting the switch to the weak field position, and is coupled to the machine by shifting the switch to the strong field position at which the clutch is engaged by the axial displacement of the armature 1 in opposition to the restraint imposed by the spring 9. When the loom or other machine is to be stopped, the switch is moved back to starting position and the spring 9 then disengages the clutch by shifting the armature 1 to the right. The motor continues in operation at the reduced field strength and a quick restarting of the loom or other machine is therefore possible. The continuous operation of the motor on disengagement of the clutch makes it possible to design the motor for a lower pick-up torque than would be practical if the motor were stopped at each disengagement of the clutch.

With the switch and circuit arrangement of Fig. 2, the sections 3T—3T of the stator windings are initially star-connected for starting and delta-connected to develop a higher magnetic field which shifts the armature 1 axially to engage the clutch. The switch 15 for controlling the stator winding connections may be of any known or desired type and is shown schematically as of drum type. The axial magnetic pull on the armature 1 with the star connection of the field coils is only one-third of that developed by the delta connection, and this magnitude spread affords wide latitude in the strength of the restraining spring 9. As indicated by the legends, the switch has an "off" position in addition to the two running positions corresponding to "unclutch" and "clutch" conditions of the drive mechanism.

Another possibility of switch control of a sectionalized stator field winding to establish magnetic fields of widely different strength is shown in Fig. 3. The winding comprises two groups of coils 16a—16c and 17a—17c in each phase which may be connected in series by double pole-double throw switches 18a—18c, as shown in Fig. 3, or may be connected in parallel upon adjustment of the switches to their alternative positions. The several switches are ganged for simultaneous operation as indicated by the legend. The field strength for the illustrated series arrangement of the coils is one-fourth of the field strength developed upon adjustment of the switches to connect the coil sections of each phase in parallel.

Other switch or circuit arrangements for adjusting the axial magnetic pull on the armature between values that are respectively above and below the restarting force of the spring 9 are of course possible and it therefore is to be understood that the invention is not limited to the circuits herein shown and described, and that variations which may occur to those familiar with the art fall within the spirit and scope of the invention as set forth in the following claims.

I claim:

1. An electric motor comprising a housing and within said housing a conical stator and a complementary conical armature having an armature shaft, bearings supporting said shaft for rotation and for axial displacement, a flywheel on said shaft and constituting one element of a clutch, a complementary clutch element on a stub shaft, spring means yieldingly opposing engagement of said clutch elements, stator field windings for establishing a magnetic field to exert on said armature a torque to set the same into rotation and an axially directed force tending to engage said clutch elements, and switch means associated with said field windings and adjustable between alternative positions to energize said field windings to develop torques in the same sense of different magnitudes and axially directed forces of correspondingly different magnitudes respectively above and below the magnitude of the restraining force of said spring means.

2. The invention as recited in claim 1, wherein said stator field windings comprise three coils for energization from a three-phase alternating current source, and said switch means is adjustable between alternative positions to establish a star or alternatively a delta connection of said coils.

3. The invention as recited in claim 1 wherein said field windings comprise two sets of three-phase coils, and said switch means is adjustable between alternative positions to connect the coils of each phase in series or alternatively in parallel.

WALTER JAGGI.

References Cited in the file of this patent

UNITED STATES PATENTS

| Number | Name | Date |
|---|---|---|
| 1,069,661 | Conrad | Aug. 5, 1913 |
| 2,058,523 | Stearns | Oct. 27, 1936 |
| 2,149,873 | Shapiro et al. | Mar. 7, 1939 |
| 2,422,906 | Johnson | June 24, 1947 |

FOREIGN PATENTS

| Number | Country | Date |
|---|---|---|
| 813,160 | France | Feb. 22, 1937 |